United States Patent [19]

Iwatani et al.

[11] Patent Number: 5,210,480
[45] Date of Patent: May 11, 1993

[54] CONTROL DEVICE OF VEHICLE MOUNTED ALTERNATOR

[75] Inventors: Shiro Iwatani; Yoshiyuki Iwaki, both of Hyogo, Japan

[73] Assignee: Mitsubishi Denki K.K., Tokyo, Japan

[21] Appl. No.: 859,623

[22] Filed: Mar. 20, 1992

Related U.S. Application Data

[63] Continuation of Ser. No. 548,523, Jul. 5, 1990, abandoned.

[30] Foreign Application Priority Data

Jul. 12, 1989 [JP] Japan .................................. 1-181032

[51] Int. Cl.$^5$ .............................................. H02J 07/14
[52] U.S. Cl. ......................................... 322/28; 322/25; 320/64
[58] Field of Search ....................... 322/25, 28, 29, 35, 322/73; 320/64

[56] References Cited

U.S. PATENT DOCUMENTS

| | | | |
|---|---|---|---|
| 4,281,358 | 7/1981 | Plouffe et al. | 361/22 |
| 4,341,014 | 7/1982 | Loy et al. | 81/9.51 X |
| 4,346,337 | 8/1982 | Watrous | 322/25 |
| 4,451,776 | 5/1984 | Iwaki et al. | 322/29 X |
| 4,634,954 | 1/1987 | Kato et al. | 322/28 |
| 4,755,734 | 7/1988 | Komurasaki et al. | 322/28 |
| 4,839,576 | 6/1989 | Kaneyuki et al. | 322/28 |
| 4,985,670 | 1/1991 | Kaneyuki et al. | 322/28 |

FOREIGN PATENT DOCUMENTS

| | | |
|---|---|---|
| 0246976 | 11/1987 | European Pat. Off. . |
| 0289608 | 9/1988 | European Pat. Off. . |
| 0302735 | 9/1988 | Japan . |
| 63-302735 | 9/1988 | Japan . |
| 1483033 | 8/1977 | United Kingdom . |
| 2065936A | 7/1981 | United Kingdom . |
| 2087173A | 5/1982 | United Kingdom . |

*Primary Examiner*—Steven L. Stephan
*Assistant Examiner*—Kristine Peckman
*Attorney, Agent, or Firm*—Sughrue, Mion, Zinn, Macpeak & Seas

[57] ABSTRACT

A control device of a vehicle-mounted, self-excited alternator for supplying a field current to its field coil and selectively a charge current to a battery and a power to a high voltage electric load of the vehicle comprises a field current detector for detecting field current flowing through the field coil and a field current limiter which includes a reference device for providing a fixed reference value, a comparator for comparing the field current detected by the field current detector with the fixed reference value and a voltage regulator control device responsive to an output of the comparator to control the voltage regulator to cut-off the field current when the field current detected is larger than the reference value.

2 Claims, 1 Drawing Sheet

5,210,480

CONTROL DEVICE OF VEHICLE MOUNTED ALTERNATOR

This application is a continuation of Ser. No. 07/548,528, filed Jul. 5, 1990, now abandoned.

BACKGROUND OF THE INVENTION

The present invention relates to a control device for an alternator and, particularly, to a control device for a vehicle-mounted alternator for temporarily switching an output connection of the alternator from a storage battery to a high voltage electric load of the vehicle, the load being driven by a higher voltage than an ordinary output voltage of the alternator to be supplied to the battery to charge the battery, so that enough power is supplied to the load.

In order to melt frozen water on a front glass of a vehicle in a low temperature area within a short time, a system has been proposed in which an output voltage of an alternator is switched from a usual 14 V for charging a vehicle-mounted storage battery to a high voltage of 40-70 V temporarily to supply power of about 1 KW to a high voltage load such as a heater embedded in the front glass.

When a separately-excited alternator, that is, an alternator whose exciting current is supplied from a battery, is used as the vehicle-mounted alternator, the battery may be discharged during much of this high voltage driving. Therefore, in order to avoid such undesirable discharge of the battery, a self-excited alternator, that is, an alternator whose exciting current is supplied from an output thereof, is used. In such a case, however, another problem may occur. That is, a field coil of the self-excited alternator may be burnt by large field current due to high voltage applied thereacross.

U.S. Pat. No. 4,346,337 and Japanese Kokai (Patent) No. 63-302735 each disclose a field current limitation of a self-excited alternator. In both of these systems, an oscillator is provided to produce a fixed pulse waveform signal by which a field current control element is on-off controlled when a detection of field current exceeds a predetermined value. Since, in these systems, a voltage applied across the field coil is fixed to a certain value, for example, 40 V, the current limit value itself varies with variation of the output voltage of the alternator. Since the field current limit value at, for example, 80 V may be twice the limit value at 40 V, it is impossible to prevent the burning of the field coil completely.

SUMMARY OF THE INVENTION

An object of the present invention is to obtain a control device of a vehicle-mounted alternator by which the storage battery discharge and burning of the field coil are prevented.

The control device according to the present invention comprises field current detection means for detecting field current and a field current limiter for cutoff, of the field current when it exceeds a predetermined value.

In the present invention, field current is detected and when it exceeds a predetermined value, the field current is cut-off.

DETAILED DESCRIPTION OF THE PREFERRED EMBODIMENT

Figure 1:
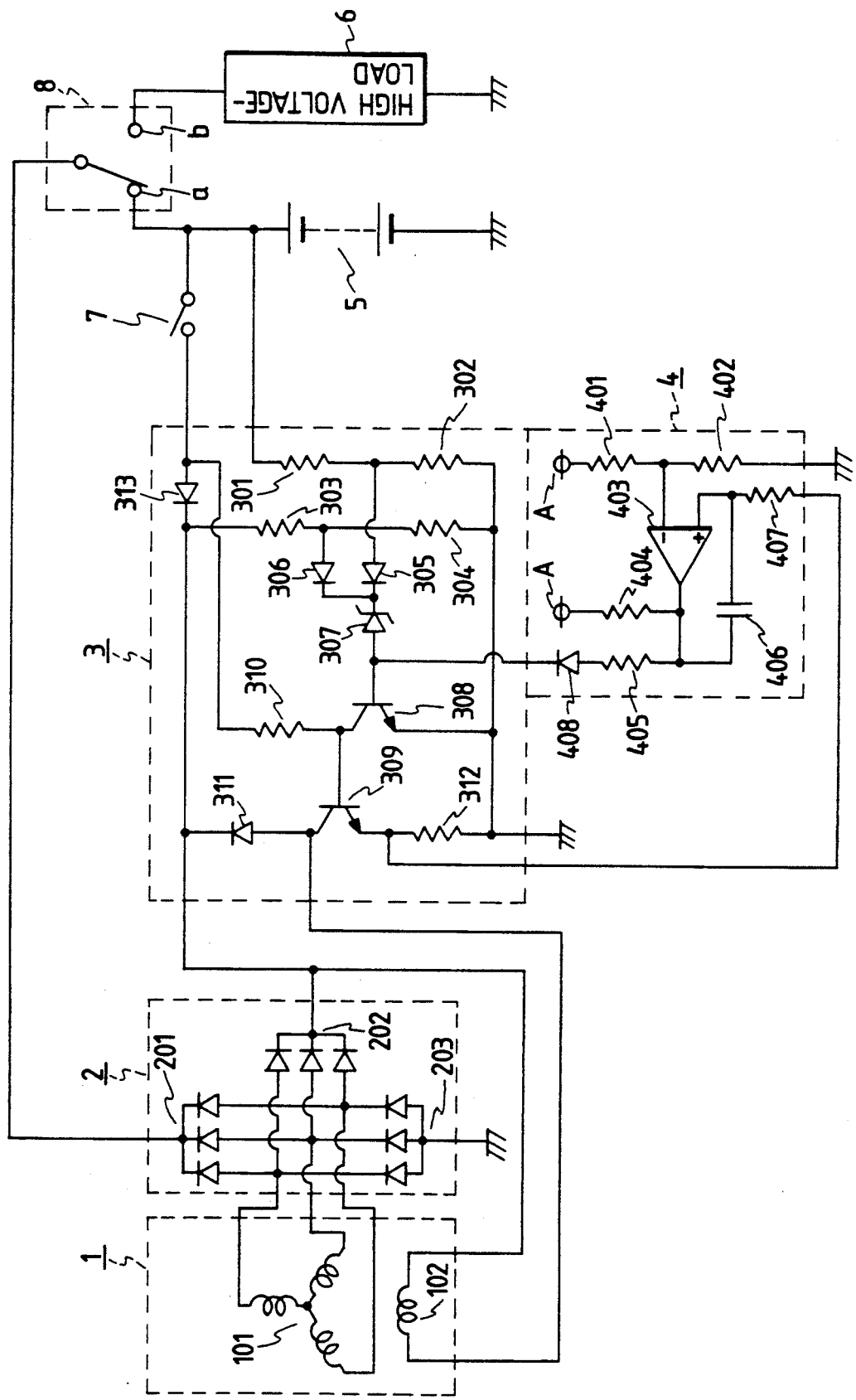
FIG. 1 is a circuit diagram of a control device of a vehicle mounted alternator according to the present invention.

An embodiment of the present invention will be described below with reference to the drawing.

FIG. 1 shows a circuit diagram of a control device of a vehicle-mounted alternator according to this embodiment. An alternator 1 is adapted to be driven by an engine of a vehicle. The alternator 1 is of the self-excited type and has an armature coil 101 and a field coil 102.

A rectifier 2 is included for full-wave rectification of an a.c. output of the alternator 1, which has output terminals 201, 202 and 203. The output terminal 201 is a main rectifier output terminal from which a main output is provided, the output terminal 202 is an auxiliary rectifier output terminal for exciting the field coil 102 and the output terminal 203 is a grounding terminal.

A voltage regulator 3 is connected to the auxiliary rectifier output terminal 202 for controlling the output voltage of the alternator 1 to a predetermined valve, which is composed of a voltage divider composed of resistors 301 and 302 for detecting a voltage of a storage battery 5, a voltage divider composed of resistors 303 and 304 for detecting a voltage at the auxiliary rectifier output terminal 202, reverse blocking diodes 305, 306 for separating between these voltage divider circuits, a Zener diode 307, a control transistor 308 on-off controlled by on-off operation of the Zener diode 307, an output transistor 309 for on-off controlling the field current flowing through the field coil 102 and on-off controlled by the control transistor 308, a base resistor 310 of the output transistor 309, a diode 311 connected in parallel to the field coil 102 to absorb on-off surge generated in the field coil 102, a field current detecting element 312 composed of a resistor having a value of several of ohm-meters and a reverse blocking diode 313.

A field current limiter 4 is provided for limiting the field current to the predetermined value, which is composed of a voltage divider composed of series resistors 401 and 402 for dividing a constant voltage from a constant voltage source A to produce a reference voltage, a comparator 403 having an inversion input supplied with the reference voltage, an output circuit of the comparator 403 composed of resistors 404 and 405, a capacitor 406 and a resistor 407 which constitute a feedback circuit of the comparator and a reverse blocking diode 408 in series with the resistor 405.

A high voltage electric load 6 of a vehicle is connected such that it can be driven by the output of the alternator 1 separately from the storage battery 5 for a short time.

An output changeover switch 8 has a contact a connected to the storage battery 5 and a key-switch 7 of the vehicle and a contact b connected to the high voltage electric load 6. The switch 8 serves to switch the output connection of the alternator 1 between the storage battery 5 and the high voltage vehicle electric load 6.

In operation, the output changeover switch 8 is normally in the position shown so that the output of the alternator 1 is connected to the storage battery 5 to operate in a battery charge mode.

In this battery charge mode, upon a closure of the key switch 7 for starting the engine, a field current flows from the storage battery 5 through the key switch 7 and the reverse blocking diode 313 to the field coil 102, making the alternator ready to generate power. Then, when the engine is started and the alternator 1 is driven and commences its power generation, a voltage at the main rectifier output terminal 201 increases by which the battery 5 is charged to increase its terminal voltage.

The voltage regulator 3 detects the terminal voltage of the storage battery 5 by means of the voltage divider composed of the series resistors 301 and 302. When the terminal voltage exceeds a predetermined charging voltage set to, for example, 14 V, by resistances of the resistors 301 and 302 of the voltage divider, the Zener diode 307, supplied with the voltage divided through the reverse blocking diode 305, is turned on. Thus the control transistor 308 having a base connected to the Zener diode 307 is also turned on. On the contrary, when the terminal voltage of the storage battery 5 becomes below the predetermined value, the Zener diode 307 is turned off and thus the control transistor 308 is turned off. Therefore, the output transistor 309 having a base connected to a collector of the control transistor 308 is turned off.

Thus, the field current flowing through the field coil 102 is on-off controlled according to the on-off operation of the control transistor 308 to regulate the terminal voltage of the storage battery 5.

In this case, field current is supplied from the auxiliary rectifier output terminal 202, resulting in self-excited operation.

When the output changeover switch 8 is shifted to the contact b so that the output of the alternator 1 is connected to the high voltage electric load 6, the storage battery 5 is separated from the output of the alternator and no charging is performed. Therefore, the terminal voltage of the battery 5 becomes lower than the predetermined value 14 V set by the voltage divider 301 and 302. Therefore, the output transistor 309 is conductive continuously. Thus the output voltage of the alternator 1 and hence the auxiliary rectifier output terminal 202 continue to rise.

The voltage at the auxiliary rectifier output terminal 202 is detected by the voltage divider composed of the series resistors 303 and 304. When it exceeds a predetermined high voltage value set by these resistors 303 and 304 to, for example, 70 V, the Zener diode 307 connected through the reverse blocking diode 306 to the voltage divider is turned on. Thus the control transistor 308 is turned on.

On the contrary, when the terminal voltage of the auxiliary rectifier output terminal 202 is lowered below the predetermined high voltage value, the Zener diode 307 is turned off. Thus the control transistor 308 is turned off, causing the output transistor 309 to be turned on.

Therefore, the output transistor 309 is also on-off controlled, so that the output voltage of the alternator 1 is regulated to the predetermined high voltage value, in a high voltage mode. In this case, the field current supplied from the auxiliary rectifier output terminal 202 is 5 times that in the battery charge mode due to the output voltage of 70 V which is 5 times the voltage 14 V in the battery charge mode. Therefore, heat generation in the field coil 102 becomes so large that the coil 102 may be burnt, if this condition continues.

The field current limiter 4 prevents the field coil 102 from being burnt. An increase of field current with increase of voltage at the auxiliary rectifier output terminal 202 is detected as a voltage by a field current detecting resistor element 312 connected in series with the output transistor 309 of the voltage regulator 3 and through the resistor 407 to a non-inverse input of the comparator 403. When the detected voltage value exceeds a predetermined value corresponding to a field current limit set by the voltage divider resistors 401 and 402, an output of comparator 403 becomes a high level, so that a current flows from the constant voltage source A through the resistors 404 and 405 and the diode 408 to the base of the control transistor 308 so that the control transistor 308 is turned on. Thus the output transistor 309 is turned off. Therefore, field current is limited to the above mentioned limit value, preventing burning of the field coil 102.

In the case where field current is below the limit value, the output of the comparator 403 becomes a low level providing no influence on the operation of the control transistor 308. The feedback circuit composed of the capacitor 406 and the resistor 407 serves to prevent an abnormal oscillation of the operation of the comparator 403.

As mentioned, according to the present invention, field current is cut-off when it exceeds the predetermined value. Therefore it is possible to reliably prevent burning of the field coil even if the alternator output varies. Further, due to the self-excited type, it is possible to prevent undesirable discharge of the storage battery even in the high voltage mode.

What is claimed is:

1. A control device for a vehicle-mounted, self-excited alternator having an armature coil (101) and a field coil (102), and including a rectifier (2) for rectifying an a.c. output of said alternator, and for supplying a field current to said field coil and a charging current to a vehicle-mounted storage battery (5), a high voltage electric load (6) of said vehicle being energizable by a first voltage which is substantially higher than a second voltage, said second voltage being a terminal voltage of said storage battery, and a changeover switch (8) for selectively connecting an output of said rectifier to one of said storage battery and said high voltage electric load, said control device comprising:

field current detection means (312) for detecting field current flowing through said field coil; and a field current limiter (4) for cutting off said field current when the field current exceeds a predetermined value, wherein said field current limiter comprises reference means (401, 402) for providing a fixed reference value, a comparator (403) for comparing the field current detected by said field current detection means with said fixed reference value, and control means responsive to an output of said comparator to control a voltage regulator to cut-off the field current when the field current detected is larger than said reference value, said field current limiter further comprising a resistor (407) through which said field current flowing through said field coil is input to said comparator (403); and wherein said voltage regulator receives an input from said storage battery, said input being indicative of said terminal voltage of said storage batter, said changeover switch exclusively connecting the rectifier output to the battery for the charging thereof in a first position, and exclusively connecting the rectifier output to the high voltage electric load in a second position.

2. A control device claimed in claim 1, wherein said comparator includes a negative feedback circuit for preventing an abnormal oscillation of said comparator, wherein said negative feedback circuit includes said resistor (407).

* * * * *